United States Patent Office 2,723,960
Patented Nov. 15, 1955

2,723,960

DESALTING COMPOSITIONS

Willard H. Kirkpatrick, Sugar Land, and Alice Walker, Houston, Tex., assignors to Visco Products Company, Houston, Tex., a corporation of Delaware No Drawing. Application August 30, 1951,
Serial No. 244,466

8 Claims. (Cl. 252—341)

This invention relates to new and improved compositions adapted for the treatment of emulsions of mineral oil and water, such as petroleum emulsions commonly occurring in the production, handling and refining of crude mineral oil for the purpose of separating the oil from the water. Also, the invention relates to compositions suitable for the treatment of other water-in-oil types of emulsions wherein the emulsions are produced artificially or naturally and the resolution of the emulsions presents a problem of recovery or disposal.

One of the objects of the invention is to provide a novel and useful composition for resolving emulsions of the character referred to into their component parts of oil and water or brine.

Another object of the invention is to provide a novel and useful composition for "desalting" of refinery crude charge stocks going to the stills. "Desalting" is the conventional term used to designate the operation wherein the salt content of crude oil is substantially reduced. This operation consists of artificially creating an emulsion of crude oil with water and subsequently resolving said emulsion by treatment with one of the reagents described herein.

Still another object of the invention is to provide a novel reagent which is water-wettable, interfacial and surface-active in order to enable its use as a demulsifier or for such uses where surface-active characteristics are necessary or desirable. Other objects will appear hereinafter.

The compositions provided in accordance with the present invention are condensation products with the elimination of water of (1) a polymer of a drying oil acid; (2) an alkylolamine; (3) a polyhydric alcohol, preferably a polyalkylene glycol; and (4) a polycarboxy organic acid containing not more than 8 carbon atoms and preferably having adjacent carboxy groups. The condensation is effected to the point where the product is water-wettable. Products of this type have been found to be especially useful in refinery desalting operations.

The polymers of the drying oil acids are dimers, trimers, tetramers, etc., wherein one molecule of a drying oil acid is linked to another molecule of a drying oil acid in such a way that the carboxy groups of the drying oil acid are rather widely spaced from one another. It is assumed that this linkage occurs between double bonds of the drying oil acid. The polymers of drying oil acids of the linoleic acid series are especially suitable for the practice of the invention as, for example, the polymers of sorbic acid, geranic acid, palmitolic acid, linoleic acid, humoceric acid and eicosinic acid. The polymers of linolenic acid and other acids of the linolenic acid series are illustrative of additional polymeric acids suitable for the practice of the invention. For the purpose of the invention the dimer acids have given especially satisfactory results, it being understood, however, that the commercial forms of these acids may include polymers containing more than two molecules of the drying oil acid. The preferred dimer acids are those containing 12 to 40 carbon atoms.

The preferred alkylolamine is triethanolamine which is a viscous and very hygroscopic liquid which boils at 244° C. at 50 mm. A commercial product which is used for the purposes of the invention contains not more than 2.5% monoethanolamine and not more than 15% diethanolamine and not less than 80% triethanolamine. The neutral equivalent of the commercial product will average about 140 and is entirely satisfactory for the purposes of the invention. Modification of triethanolamine can be secured by condensing in the presence or absence of zinc chloride and/or other multivalent metallic salts in an elevated temperature with or without molecular dehydration. There is little evidence available to indicate the nature and constitution of the material resulting from the molecular dehydration and/or polymerization of triethanolamine. From the fact that varying proportions of acidic salts such as zinc chloride produce different products, it may be deduced, however, that the metal actually forms a complex with the alkylolamine. This is evidenced by the fact that in one series of preparations 7% zinc chloride by weight of triethanolamine gave a molecularly dehydrated amine product of different characteristics from 1% zinc chloride. By acidic salts is meant those salts having an electronegative charge greater than the electronegative charge of the —OH ion. For the most part these acidic salts are salts of strong acids, e. g., chlorides, nitrates, phosphates, sulfonates, sulfates and sulfamates.

Other examples of suitable primary, secondary and tertiary alkylolamines for these purposes are as follows: diethanolamine, octylethanolamine, cyclohexylethanolamine, diisopropanolamine, triisopropanolamine, 2-amino-2-methyl-1-propanol and polyethanolamines. Recently there has become available a commercial product satisfactory for the purposes of the invention designated as "amine residue T" (also called Polyamine T) which is a still residue from the manufacture of triethanolamine.

The polyhydric alcohols which are preferably employed for the purposes of the invention are polyalkylene glycols. Simple glycols, e. g., ethylene glycol, propylene glycol, etc., glycerine, polyglycerol and related di- or polyhydroxy compounds containing two, three, four, five and six hydroxy groups can also be employed for the purpose of the invention. Likewise, polyoxypropylene glycols and homologues thereof may be used.

Polyalkylene glycols comprise a series of polymers having the general formula $$HO(C_nH_{2n}OC_nH_{2n})_xOH$$

wherein $n$ and $x$ are the same or different whole numbers. Polyethylene glycols are currently available in technical quantities and are offered in polymeric grades corresponding to molecular weights of 200, 300, 400, 600, 1000, 1500, 1540, 4000 and 6000. Up to a molecular weight of 600, the materials all are viscous, light colored, somewhat hygroscopic liquids of low vapor pressure and are characterized by complete solubility in water and in many organic solvents. Examples of the latter are aliphatic ketones and alcohols, glycol ethers, aliphatic esters and aromatic hydrocarbons. Structurally, the polyethylene glycols are characterized by a large number of ether linkages and two terminal hydroxyl groups so that they are heat stable and inert to many chemical agents. The higher molecular weight polyethylene glycols are bland, odorless solids. The following are the physical properties of the two polyethylene glycols which are the preferred reactants.

POLYETHYLENE GLYCOLS

|  | 300 | 400 |
|---|---|---|
| Average Molecular Weight | 285 to 315 | 380 to 420. |
| Freezing Range, °C | −15 to 8 | 4 to 10. |
| Specific Gravity, 20/20 °C | 1.13 | 1.13. |
| Flash Point, °F | 385 | 435. |
| Saybolt Viscosity at 210° F., Sec | 42 to 46 | 45 to 55. |
| Water Solubility at 20° C., percent by weight | Complete | Complete. |
| Comparative Hygroscopicity (Glycerol = 100) | 70 | 60. |

Phthalic anhydride, maleic anhydride and the corresponding acids are examples of polycarboxy organic compounds in which carboxy groups are adjacent to each other in the molecule. Since the condensation reaction involved results in the elimination of water, it is preferable to start with the anhydride rather than the free acid. The expression "polycarboxy organic acid containing adjacent carboxy groups" is used herein to refer to both the free acid and the anhydride. The latter form is the one more readily available commercially. The preferred polycarboxy organic acids having adjacent carboxy groups are those in which the carbon atoms to which these carboxy groups are attached are connected by a double bond. Other examples of suitable acids are diglycolic acid, succinic acid, terephthalic acid, malic acid, citric acid and their homologues. In general, these acids are also capable of forming anhydrides.

The relative proportions of the reactants may be varied but it is preferable to employ ⅓ to 3 mols of alkylolamine per carboxy group of the polymer drying oil acid, 1 to 3 mols of polyhydric alcohol per carboxy group of the polymer drying oil acid and ½ to 3 mols of the polycarboxy organic acid having carboxy groups on adjacent carbon atoms per mol of polyhydric alcohol.

In the preferred compositions the quantity of alkylolamine is such that the ratio of hydroxy groups in the alkylolamine to carboxy groups in the polymer drying oil acid is within the range of 1:3 to 3:1. In general, it is preferable to employ a sufficient quantity of the alkylolamine so that the number of hydroxy groups present therein is more than is theoretically required to react with all of the carboxy groups in the polymer drying oil acid with the elimination of water. If excess hydroxy groups are present in the resultant condensation product they react further with the polyhydric alcohol. If excess carboxy groups are present they can also react with the polyhydric alcohol. The quantity of the polyhydric alcohol should be sufficient so that there are still some free hydroxy groups in the resultant product which are capable of being esterified by the polycarboxy organic acid having carboxy groups on adjacent carbon atoms.

The reaction is preferably effected in stages with the polymer drying oil acids and the alkylolamine being reacted in the first stage followed by further reaction with the polyhydric alcohol in a second stage and reaction with the polycarboxy organic acid having carboxy groups on adjacent carbon atoms in a third stage. The reaction in each stage is effected under conditions facilitating the elimination of water. The temperature will vary depending upon the reactants but in general will be within the range of 140° C. to 300° C. As will be apparent from the examples the temperature is raised progressively as water is distilled from the reaction mixture.

The temperatures at which the water begins to distil is usually lower in the first stage than in the second and third stages. Thus, in the preparation of a typical composition the water began to distil in the first stage at about 140° C., in the second stage at about 200° C. and in the third stage at about 190° C.

In order to illustrate specifically the new types of materials contemplated for use in accordance with the present invention, the following examples are set forth below as being typical of products suitable for use. It is to be understood, however, that we do not confine ourselves to the specific chemicals, or proportions thereof, set forth in these examples as it will be obvious that equivalents of these chemicals and other proportions may be used without departing from the spirit of the invention or the scope of the appended claims.

*Example I*

To 150 parts of a dimer acid, which is a commercial form of a dimeric polymer consisting essentially of dilinoleic acid, there is added 75 parts of triethanolamine and 150 parts of SO₂ extract. This mixture is stirred with heating until a total of 9 parts of an aqueous distillate is secured. This aqueous distillate is secured in three hours at an initial temperature of 147° C. and a maximum temperature of 194° C. The intermediate is cooled to about 80° C. and 75 parts of phthalic anhydride added and the temperature is raised to secure reaction of the dibasic acid which occurs after one hour of heating at about 145° C. At this point 100 parts of polyethylene glycol 400 is added and the temperature raised to secure 6.5 parts of an aqueous distillate which comes over in approximately 1 hour with an initial temperature of 173° C. and a maximum temperature of 201° C. The reaction mass is cooled and 55 parts of isopropanol and approximately 265 parts of SO₂ extract are added with stirring and additional cooling to yield the finished product.

*Example II*

1920 lbs. emery dimer acid
700 lbs. triethanolamine
300 gals. substitute SO₂ extract The above are heated with loss of aqueous distillate until a total of 14 gallons of water have been secured. The reaction mass is cooled to approximately 150° C. to 160° C. and 1280 lbs. of polyethylene glycol 400 are added and heat resumed until a total of 9 gallons of water has been additionally secured.

The intermediate is then cooled to below 100° C. This cooling step is important and must be carried to the temperature indicated. Six (6) bags (480 lbs.) phthalic anhydride are added and reheated until an additional 3 gallons of water has been secured. The product is then cooled to approximately 140° C. to 150° C. and 420 gallons substitute SO₂ extract added to yield the finished product.

*Example III*

1800 lbs. emery dimer acids
240 gals. substitute SO₂ extract
425 lbs. diethanolamine The above are charged into a processing vessel and heated with agitation to remove approximately 110 lbs. of an aqueous distillate. The distillate begins to appear at 140° C., and the required amount is secured at a final temperature of 190° C. At this point 1350 lbs. of a polyethylene glycol having a molecular weight of 400 is added to the intermediate and the mass heated to remove approximately 50 lbs. of an aqueous distillate. The distillate begins to form at about 200° C., and the required amount is secured at a final temperature of about 220° C. The reaction mass is then cooled to 100° C., and 320 lbs. of phthalic anhydride added with the temperature raised until a total of about 35 lbs. of an aqueous distillate has been secured. This distillate begins to appear at about 190° C., and the required amount is secured at a final temperature of about 240° C. The mass is then cooled to 150° C. at which point 1000 gallons of substitute SO₂ extract is added with agitation and the resulting product cooled to approximately 75° C. to yield the finished product.

*Example IV*

This example illustrates the employment of the compositions of the invention in a desalting operation. In this operation the petroleum refinery was running a crude charge stock averaging 244 barrels of petroleum oil hourly. During the two days plant test the water which was added to the petroleum oil for the purpose of desalting varied from a low of 12% to 24% of the crude charge. Prior to the start of the test the crude charge petroleum oil analyzed 155 lbs. of salt per 1000 barrels of oil. The desalted crude charge stock contained 39 lbs. of salt per 1000 barrels of oil and the desalted crude oil had a grind out value of 0.2% BS & W. Before starting the plant test with compositions of the present invention, a competitive chemical was being used at the rate of about 20 quarts per day with a reduction in salt content of 75%.

The addition of the composition of Example I was started at 8:50 a. m. of one day and continued until 4:30 p. m. of the next day. During this period adjustments were made in the amount of water used in the desalting and the amount of chemical was reduced until for a period of 24 hours the grind outs of the desalted crude oil to the still showed a trace to 0.1% BS & W. The salt content of the crude oil had increased to about 185 lbs. per 1000 barrels during this period. The addition of the composition of Example I effected an 82% salt removal. The consumption of the composition of Example I during this period averaged 14.5 quarts per day. Thus, there was an improvement in desalting efficiency and an economy in chemical consumption by the practice of this invention.

From the above examples it is noted that satisfactory products are secured by carrying out the various reactions in stages. Satisfactory products are also prepared by carrying out the reactions simultaneously.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion can readily be determined by conventional procedures. The products may be used as such for resolving emulsions of the water-in-oil type or they may be admixed with other demulsifying reagents in varying ratios as required by the problem at hand.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

The term "drying oil acid" is used herein to mean an unsaturated fatty acid containing at least two double bonds and at least six carbon atoms.

The invention is hereby claimed as follows:

1. A process for breaking emulsions of the water-in-oil type comprising subjecting the emulsion to the action of a water-wettable condensation product of a polymer of a drying oil acid, an alkylolamine, a polyhydric alcohol and a polycarboxy organic acid containing not more than 8 carbon atoms, the proportions of said reactants being within the range of ⅓ to 3 mols of alkylolamine per carboxy group of said drying oil acid polymer, 1 to 3 mols of polyhydric alcohol per carboxy group of said drying oil acid polymer and 1 to 3 mols of polycarboxy organic acid containing not more than 8 carbon atoms per mol of polyhydric alcohol, the condensation being effected under conditions facilitating the elimination of water at temperatures of at least 140° C. and the drying oil acid polymer being reacted with the alkylolamine prior to the addition of the other reacting components.

2. A process for breaking emulsions of the water-in-oil type comprising subjecting the emulsion to the action of a water-wettable condensation product derived from the reaction of a dimer drying oil acid containing 36 to 40 carbon atoms reacted with ⅓ to 3 mols of alkylolamine per carboxy group of said acid, the resultant condensation product then being further reacted with 1 to 3 mols of a polyalkylene glycol per carboxy group of said acid, and the resultant condensation product of said last reaction being further reacted with ½ to 3 mols of a polycarboxy organic acid containing not more than 8 carbon atoms and having carboxy groups attached to adjacent carbon atoms per mol of said polyalkylene glycol, all of said reactions being effected under conditions facilitating the elimination of water at temperatures of at least 140° C.

3. A process for breaking emulsions of the water-in-oil type comprising subjecting the emulsion to the action of a water-wettable condensation product derived from the reaction of a dimer drying oil acid containing 36 to 40 carbon atoms reacted with ⅓ to 3 mols of alkylolamine per carboxy group of said acid, the resultant condensation product then being further reacted with 1 to 3 mols of a polyethylene glycol having a molecular weight within the range of 200 to 600 per carboxy group of said acid, and the resultant condensation product of said last named reaction being further reacted with ½ to 3 mols of a polycarboxy organic acid containing not more than 8 carbon atoms and having carboxy groups attached to adjacent carbon atoms per mol of said polyethylene glycol, all of said reactions being effected under conditions facilitating the elimination of water at temperatures of at least 140° C.

4. A process for breaking emulsions of the water-in-oil type comprising subjecting the emulsion to the action of a water-wettable condensation product derived from the reaction of 1 mol of a polymer of a drying oil acid consisting essentially of dilinoleic acid and a quantity of diethanolamine such that the molar ratio of hydroxy groups in the diethanolamine to carboxy groups in the dilinoleic acid is in excess of 1:1 but not greater than 3:1, the resultant reaction product being further reacted with a polyethylene glycol having a molecular weight within the range of 200 to 600 in proportions within the range of 1 to 3 mols per carboxy group in each mol of said drying oil acid polymer, and the condensation product from said last reaction being further reacted with ½ to 3 mols of phthalic anhydride per mol of said polyethylene glycol, said reactions being effected with the elimination of water at a temperature of at least 140° C. to produce a water-wettable product.

5. A process for breaking emulsions of the water-in-oil type comprising subjecting the emulsion to the action of a water-wettable condensation product derived from the reaction of 1 mol of a polymer of a drying oil acid consisting essentially of dilinoleic acid and a quantity of triethanolamine such that the molar ratio of hydroxy groups in the triethanolamine to carboxy groups in the dilinoleic acid is in excess of 1:1 but not greater than 3:1, the resultant reaction product being further reacted with a polyethylene glycol having a molecular weight within the range of 200 to 600 in proportions within the range of 1 to 3 mols per carboxy group in each mol of said drying oil acid polymer, and the condensation product from said last reaction being further reacted with ½ to 3 mols of phthalic anhydride per mol of said polyethylene glycol, said reactions being effected with the elimination of water at a temperature of at least 140° C. to produce a water-wettable product.

6. A process of desalting mineral oils which comprises mixing a mineral oil containing water soluble salts with water and subjecting the resultant mixture to the action of a water-wettable condensation product of a polymer of a drying oil acid, an alkylolamine, a polyhydric alcohol and a polycarboxy organic acid having carboxy groups attached to adjacent carbon atoms, the proportions of said reactants being within the range of ⅓ to 3 mols of alkylolamine per carboxy group of said drying oil acid polymer, 1 to 3 mols of polyhydric alcohol per carboxy group of said drying oil acid polymer and 1 to 3 mols of polycarboxy organic acid containing not more than 8 carbon atoms and having carboxy groups attached to adjacent carbon atoms per mol of polyhydric alcohol, and the condensation being effected under conditions facilitating the elimination of water at temperatures of at least 140° C.

7. A process of desalting mineral oils which comprises mixing a mineral oil containing water soluble salts with water and subjecting the resultant mixture to the action of a water-wettable condensation product derived from the reaction of 1 mol of a polymer of a drying oil acid consisting essentially of dilinoleic acid and a quantity of diethanolamine such that the molar ratio of hydroxy groups in the diethanolamine to carboxy groups in the dilinoleic acid is in excess of 1:1 but not greater than 3:1, the resultant reaction product being further reacted with a polyethylene glycol having a molecular weight within the range of 200 to 600 in proportions within the range of 1 to 3 mols per carboxy group in each mol of said drying oil acid polymer, and the condensation product from said last reaction being further reacted with ½ to 3 mols of phthalic anhydride per mol of said polyethylene glycol, said reactions being effected with the elimination of water at a temperature of at least 140° C. to produce a water-wettable product.

8. A process of desalting mineral oils which comprises mixing a mineral oil containing water soluble salts with water and subjecting the resultant mixture to the action of a water-wettable condensation product derived from the reaction of 1 mol of a polymer of a drying oil acid consisting essentially of a dilinoleic acid and a quantity of triethanolamine such that the molar ratio of hydroxy groups in the triethanolamine to carboxy groups in the dilinoleic acid is in excess of 1:1 but not greater than 3:1, the resultant reaction product being further reacted with a polyethylene glycol having a molecular weight within the range of 200 to 600 in proportions within the range of 1 to 3 mols per carboxy group in each mol of said drying oil acid polymer, and the condensation product from said last reaction being further reacted with ½ to 3 mols of phthalic anhydride per mol of said polyethylene glycol, said reactions being effected with the elimination of water at a temperature of at least 140° C. to produce a water-wettable product.

References Cited in the file of this patent
UNITED STATES PATENTS

| | | |
|---|---|---|
| 2,166,434 | De Groote | July 18, 1939 |
| 2,282,644 | De Groote et al. | May 12, 1942 |
| 2,324,488 | De Groote et al. | July 20, 1943 |
| 2,324,494 | De Groote et al. | July 20, 1943 |
| 2,333,769 | De Groote et al. | Nov. 9, 1943 |
| 2,568,738 | Kirkpatrick et al. | Sept. 25, 1951 |